United States Patent
Baumstein et al.

(10) Patent No.: US 10,459,117 B2
(45) Date of Patent: Oct. 29, 2019

(54) EXTENDED SUBSPACE METHOD FOR CROSS-TALK MITIGATION IN MULTI-PARAMETER INVERSION

(71) Applicants: Anatoly Baumstein, Houston, TX (US); Ivan Chikichev, Houston, TX (US)

(72) Inventors: Anatoly Baumstein, Houston, TX (US); Ivan Chikichev, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1547 days.

(21) Appl. No.: 14/272,827

(22) Filed: May 8, 2014

(65) Prior Publication Data

US 2014/0358504 A1    Dec. 4, 2014

Related U.S. Application Data

(60) Provisional application No. 61/830,537, filed on Jun. 3, 2013.

(51) Int. Cl.
*G01V 99/00*        (2009.01)
(52) U.S. Cl.
CPC .................................. *G01V 99/005* (2013.01)
(58) Field of Classification Search
None
See application file for complete search history.

(56) References Cited

U.S. PATENT DOCUMENTS

| | | |
|---|---|---|
| 3,812,457 A | 5/1974 | Weller |
| 3,864,667 A | 2/1975 | Bahjat |
| | (Continued) | |

FOREIGN PATENT DOCUMENTS

| | | |
|---|---|---|
| CA | 2 796 631 | 11/2011 |
| EP | 1 094 338 | 4/2001 |
| | (Continued) | |

OTHER PUBLICATIONS

Nemeth et al., An operator decomposition approach for the separationn of signal and coherent noise in seismic wavefields, 2001, Institute of Physics Publishing, pp. 533-551 (Year: 2001).*

(Continued)

*Primary Examiner* — Omar F Fernandez Rivas
*Assistant Examiner* — Bernard E Cothran
(74) *Attorney, Agent, or Firm* — ExxonMobil Upstream Research Company—Law Department

(57) ABSTRACT

An extended subspace method for inverting geophysical data to infer models for two or more subsurface physical properties, using gradients of an objective function as basis vectors for forming model updates. The extended set of basis vectors provides explicit mixing between gradient components corresponding to different medium parameters, for example P-wave velocity and an anisotropy parameter. In a preferred embodiment, off-diagonal elements of the mixing matrix may be scaled to adjust the degree of mixing between gradient components. Coefficients of the basis vector expansion are determined in a way that explicitly accounts for leakage or crosstalk between different physical parameters. The same extended subspace approach may be used to make further improvement to the model updates by incorporating well constraints, where well log data are available.

18 Claims, 8 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,688,381 B2 | 4/2014 | Routh et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0196929 A1* | 10/2004 | Wendt ............... H04B 17/3912 375/340 |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2007/0282535 A1* | 12/2007 | Sirgue ............... G01V 1/28 702/14 |
| 2007/0296493 A1* | 12/2007 | Wang ............... H03F 1/3247 330/149 |
| 2008/0175101 A1 | 7/2008 | Saenger et al. |
| 2008/0306692 A1 | 12/2008 | Singer et al. |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |

(56) References Cited

U.S. PATENT DOCUMENTS

| | | |
|---|---|---|
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0081752 A1 | 4/2013 | Kurimura et al. |
| 2013/0238246 A1 | 9/2013 | Krebs et al. |
| 2013/0311149 A1 | 11/2013 | Tang et al. |
| 2013/0311151 A1 | 11/2013 | Plessix |
| 2014/0005815 A1* | 1/2014 | Kakkirala ............ G10L 19/018 700/94 |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Krebs et al., Fast Full Wave Seismic Inversion using Source Encoding, 2009, OnePetro, pp. 2273-2277 (Year: 2009).*

Popovivi et al., Mixed Data Layout Kernels for Vectorized Complex Arithmetic, 2017, pp. 1-7 Carnegie Mellon University (Year: 2017).*

Oxford Dictionaries, Definition of off-diagonal, 2018, Oxford Dictionaries, pp. 1 (Year: 2018).*

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75th Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transforms," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

Igel, H. et al. (1996), "Waveform inversion of marine reflection seismograms for P impedance and Poisson's ratio," *Geophys. J. Int.* 124, pp. 363-371.

Ikelle, L.T. (2007), "Coding and decoding: Seismic data modeling, acquisition, and processing," 77th Annual Int'l. Meeting, SEG Expanded Abstracts, pp. 66-70.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

(56) References Cited

OTHER PUBLICATIONS

Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," $70^{th}$ SEG Ann. Meeting, *Expanded Abstracts*, pp. 1572-1575.
Lazaratos, S. et al. (2009), "Inversion of Pre-migration Spectral Shaping,"2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," *The Leading Edge*, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007) , "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," *Geophysics*, 74(2):doi:10.1190/1.3074303, pp. Q1-Q16.
Moghaddam, P.P. et al. (2010), "Randomized full-waveform inversion: a dimenstionality-reduction approach," $80^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Rawlinson, N. et al. (2003), "Seismic Traveltime Tomography of the Crust and Lithosphere," *Advances in Geophysics* 46, pp. 81-197.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
Valenciano, A.A. (2008), "Imaging by Wave-Equation Inversion," A Dissertation, Stanford University, 138 pgs.
Van Groenestijn, G.J.A. et al. (2009), "Estimating primaries by sparse inversion and application to near-offset reconstruction," *Geophyhsics* 74(3), pp. A23-A28.
Van Manen, D.J. (2005), "Making wave by time reversal," SEG International Exposition and $75^{th}$ Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," *Geophysics* 72(2), pp. V33-V39.
Wang, K. et al. (2009), "Simultaneous full-waveform inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up-and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain information from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," *SIAM*, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
U.S. Appl. No. 14/272,020, filed May 7, 2014, Wang et al.
U.S. Appl. No. 14/286,107, filed May 23, 2014, Hu et al.
U.S. Appl. No. 14/311,945, filed Jun. 20, 2014, Bansal et al.
U.S. Appl. No. 14/329,431, filed Jul. 11, 2014, Krohn et al.
U.S. Appl. No. 14/330,767, filed Jul. 14, 2014, Tang et al.
Mora, P. (1987), "Elastic Wavefield Inversion," PhD Thesis, Stanford University, pp. 22-25.
Mora, P. (1989), "Inversion = migration + tomography," *Geophysics* 64, pp. 888-901.
Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," *SEG Expanded Abstracts*, pp. 2107-2111.

(56) References Cited

OTHER PUBLICATIONS

Nocedal, J. et al. (2006), "*Numerical Optimization, Chapt. 7—Large-Scale Unconstrained Optimization,*" Springer, New York, 2$^{nd}$ Edition, pp. 165-176.
Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & 72$^{nd}$ Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.
Porter, R.P. (1989), "Generalized holography with application to inverse scattering and inverse source problems," In E. Wolf, editor, Progress in Optics XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multicomponent OBC seismic data," *Geophysical Prospecting* 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," 73$^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.

Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Abt, D.L. et al. (2010), "North American lithospheric discontinuity structured imaged by Ps and Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," *Geophysics* 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.
Barr, F.J. et al. (1989), "Attenuation of Water-Column Reverberations Using Pressure and Velocity Detectors in a Water-Bottom Cable," 59$^{th}$ Annual SEG meeting, *Expanded Abstracts*, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beasley, C. (2012), "A 3D simultaneous source field test processed using alternating projections: a new active separation method," *Geophsyical Prospecting* 60, pp. 591-601.
Beaty, K.S. et al. (2003), "Repeatability of multimode Rayleigh wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.
Ben-Hadj-Ali, H. et al. (2009), "Three-dimensional frequency-domain full waveform inversion with phase encoding," *SEG Expanded Abstracts*, pp. 2288-2292.
Ben-Hadj-Ali, H. et al. (2011), "An efficient frequency-domain full waveform inversion method using simultaneous encoded sources," *Geophysics* 76(4), pp. R109-R124.
Benitez, D. et al. (2001), "The use of the Hilbert transform in ECG signal analysis," *Computers in Biology and Medicine* 31, pp. 399-406.

(56) References Cited

OTHER PUBLICATIONS

Berenger, J-P. (1994), "A Perfectly Matched Layer for the Absorption of Electromagnetic Waves," *J. of Computational Physics* 114, pp. 185-200.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Beylkin, G. (1985), "Imaging of discontinuities in the inverse scattring problem by inversion of a causal generalized Radon transform," *J. Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource waveform inversion to marine-streamer acquisition based on the global correlation," 73$^{rd}$ EAGE Conference, *Abstract*, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.

\* cited by examiner

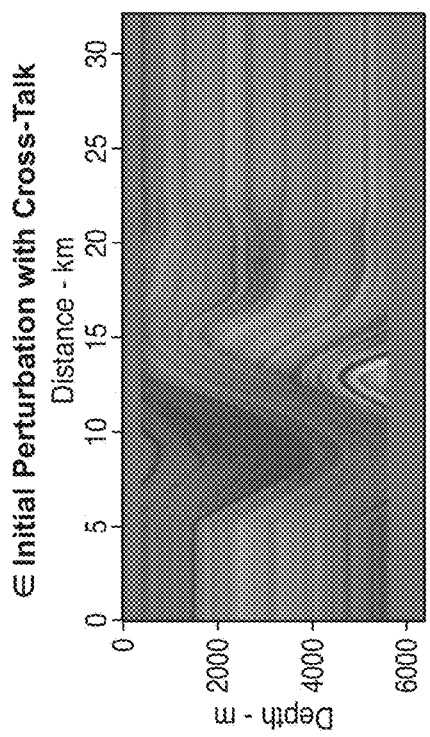
FIG. 3
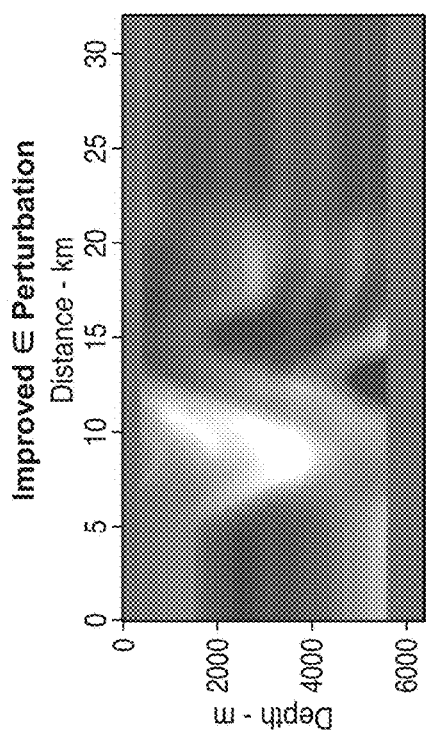
FIG. 4
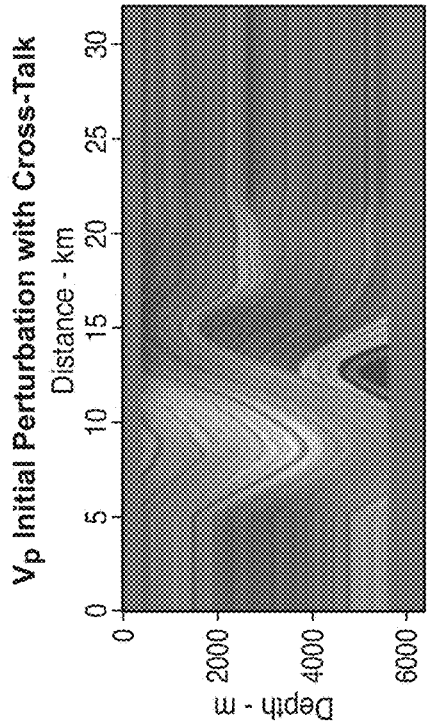
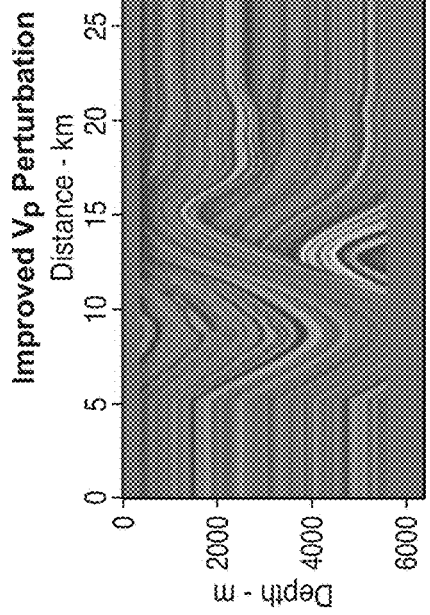

EXTENDED SUBSPACE METHOD FOR CROSS-TALK MITIGATION IN MULTI-PARAMETER INVERSION

CROSS-REFERENCE TO RELATED APPLICATION

This application claims the benefit of U.S. Provisional Patent Application 61/830,537, filed Jun. 3, 2013, entitled "Extended Subspace Method for Cross-Talk Mitigation in Multi-Parameter Inversion," the entirety of which is incorporated by reference herein.

FIELD OF THE INVENTION

This invention relates to the field of geophysical prospecting and, more particularly, to processing geophysical data. Specifically, the invention is a method for inferring properties of the subsurface based on information contained in geophysical data acquired in field experiments.

BACKGROUND OF THE INVENTION

During seismic, electromagnetic, or a similar survey of a subterranean region, geophysical data are acquired typically by positioning a source at a chosen shot location, and measuring seismic, electromagnetic, or another type of back-scattered energy generated by the source using receivers placed at selected locations. The measured reflections are referred to as a single "shot record". Many shot records are measured during a survey by moving the source and receivers to different locations and repeating the aforementioned process. The survey can then be used to perform inversion, e.g., Full Waveform/Wavefield Inversion in the case of seismic data, which uses information contained in the shot records to determine physical properties of the subterranean region (e.g., speed of sound in the medium, density distribution, resistivity, etc.). Inversion is an iterative process, each iteration comprising the steps of forward modeling to create simulated (model) data and objective function computation to measure the similarity between simulated and field data. Physical properties of the subsurface are adjusted at each iteration to ensure progressively better agreement between simulated and field data. The invention will be described primarily in the context of Full Waveform Inversion of seismic data, but can be applied to inversion of other types of geophysical data.

Multi-parameter inversion involves simultaneous updating of at least two medium properties. A typical strategy is to formulate an objective (cost) function E(m) measuring the misfit between modeled and field data, where m is a vector of medium properties whose components can be compressional and shear-wave velocities, $V_p$ and $V_s$, density $\rho$, Thompsen anisotropy parameters $\epsilon$ and $\delta$ (Tsvankin, 2001, p. 18), etc. The gradient of the objective function with respect to individual components of m is indicative of the direction in which medium parameters can be updated so that the objective function is minimized and progressively better fit of modeled and field data is obtained. The basis of this approach is the well-known Taylor series:

$$E(m + \Delta m) = E(m) + (\nabla_m E)\Delta m + \frac{1}{2}\Delta m^T (\nabla_{mm} E)\Delta m + \ldots,$$

where $\Delta m$ is the desired update; $\nabla_m E$ and $\nabla_{mm} E$ are the gradient and the Hessian of the objective function respectively. The gradient $\nabla_m E$ is a vector containing first-order derivatives of the objective function E with respect to each individual component $m_i$ of the model vector m:

$$\nabla_m E = \left[\frac{\partial E}{\partial m_i}\right].$$

The Hessian $\nabla_{mm} E$ is a matrix containing second-order derivatives of the objective function E with respect to individual components $m_i$, $m_j$:

$$\nabla_{mm} E = \left[\frac{\partial E}{\partial m_i \partial m_j}\right].$$

Clearly, if we neglect quadratic terms (the ones with the Hessian) of this expansion and set $\Delta m = -\alpha \nabla_m E$, with $\alpha > 0$, then the objective function will decrease:

$$E(m+\Delta m) = E(m) + (\nabla_m E)\Delta m = E(m) - \alpha(\nabla_m E)^2 < E(m).$$

Optimal $\alpha$ can be determined with the help of line search, which typically involves evaluating the objective (cost) function for strategically chosen values of $\alpha$ so as to find the best one.

The drawback of this approach is that the gradient does not usually provide the best possible descent direction. Different components of the gradient could be of vastly different magnitudes (especially, when they correspond to different types of medium properties, e.g., $V_p$ and $\epsilon$) and may exhibit leakage from one component to another due to interdependence of different medium parameters on one another.

A better descent direction can be obtained if the quadratic terms are taken into account. Various approaches of this type are called Newton's method, Newton-CG, and Gauss-Newton and are based on inverting the Hessian:

$$\Delta m = -(\nabla_{mm} E)^{-1} \nabla_m E.$$

Due to its size (typically $10^9 \times 10^9$ in 3D), the Hessian has to be inverted iteratively, each iteration involving application of the Hessian to a vector. Depending on the problem, the Hessian-vector products (an equivalent term for application of the Hessian to a vector), can be computed analytically, numerically using finite differences, or using the adjoint state method (Heinkenschloss, 2008). Since only a few (usually 10-20) iterations of this iterative process can be afforded in practice, the resulting approximations to the inverse Hessian are usually not very accurate and may not be able to eliminate the leakage (cross-talk) between various medium parameters or provide the correct scaling between different components of the gradient. Moreover, the inversion algorithm may lead to accumulation of artifacts $\Delta m$, resulting in a suboptimal solution.

A cheaper way to ensure proper relative scaling of the gradient components is to apply the subspace method (Kennett et al., 1988.) The key idea behind this method is to represent the model perturbation as a sum of basis vectors:

$$\Delta m = \alpha s_1 + \beta s_2 + \ldots$$

For example, for two different types of medium parameters (e.g., $V_p$ and $\epsilon$) a customary choice (Sambridge et al., 1991) is:

$$\Delta \tilde{m} = \alpha \begin{bmatrix} \Delta m_1 \\ 0 \end{bmatrix} + \beta \begin{bmatrix} 0 \\ \Delta m_2 \end{bmatrix}$$

where one typically sets $\Delta m_1 \sim (-\nabla_{m_1} E)$, $\Delta m_2 \sim (-\nabla_{m_2} E)$. $\Delta \tilde{m}$ denotes the updated (improved) model perturbation, as opposed to the original model perturbation $$E(m + \Delta \tilde{m}) \approx E(m) + \alpha(\nabla_{m_1} E)\Delta m_1 + \beta(\nabla_{m_2} E)\Delta m_2 +$$

$$\frac{1}{2}\begin{bmatrix} \alpha \Delta m_1 & \beta \Delta m_2 \end{bmatrix} \begin{bmatrix} \nabla_{m_1 m_1} E & \nabla_{m_1 m_2} E \\ \nabla_{m_2 m_1} E & \nabla_{m_2 m_2} E \end{bmatrix} \begin{bmatrix} \alpha \Delta m_1 \\ \beta \Delta m_2 \end{bmatrix}$$

Thus, each component of the gradient can be scaled independently so that the resulting search direction is improved. The scaling factors α and β are chosen so that the quadratic approximation to the objective function is minimized:

$$\Delta m = \begin{bmatrix} \Delta m_1 \\ \Delta m_2 \end{bmatrix}.$$

It is easy to show that the minimum of the objective function will be obtained if we set $$\begin{bmatrix} \alpha \\ \beta \end{bmatrix} = -\begin{bmatrix} \Delta m_1^T(\nabla_{m_1 m_1} E)\Delta m_1 & \Delta m_1^T(\nabla_{m_1 m_2} E)\Delta m_2 \\ \Delta m_2^T(\nabla_{m_2 m_1} E)\Delta m_1 & \Delta m_2^T(\nabla_{m_2 m_2} E)\Delta m_2 \end{bmatrix}^{-1} \begin{bmatrix} (\nabla_{m_1} E)\Delta m_1 \\ (\nabla_{m_2} E)\Delta m_2 \end{bmatrix}.$$

The cost of determining the values of α and β (which provide the desired scaling of the gradient components) is equal to two applications of the Hessian to a vector ($\Delta m_1$ and $\Delta m_2$), making this method far cheaper than Newton/Newton-CG/Gauss-Newton.

However, the limitation is that the leakage (cross-talk) cannot be handled effectively, since all the subspace method does is scale each component of the gradient up or down (by α and β).

SUMMARY OF THE INVENTION

In one embodiment, the invention is, referring to the reference numbers in the FIG. 10 flow chart, a computer-implemented method for iteratively inverting measured geophysical data to infer 3D subsurface models of N≥2 physical properties, comprising: (a) providing an initial model (101) for each physical property, wherein a subsurface region is subdivided into discrete cells, each cell having a value of the physical property; (b) for each physical property and for each of a plurality of the cells, representing a search direction (102), indicating whether the initial model needs to be updated positively or negatively, as a linear combination of M>N basis vectors, wherein (bi) each basis vector has its own coefficient in the linear combination, said coefficient to be determined; (bii) each basis vector has a component that is, or is proportional to, a gradient, with respect to model parameters of one of the N physical properties, of an objective function measuring misfit between model-simulated geophysical data and the measured geophysical data; and (biii) the coefficients are simultaneously optimized (103), using a computer, to minimize or maximize the objective function; and (c) using the optimized coefficients to generate search directions (105), and using the search directions to generate an updated model (106) for each physical property.

In a preferred variation of the foregoing embodiment, the degree of mixing between gradient (search direction) components may be adjusted by scaling the off-diagonal components of the mixing matrix, i.e., a matrix whose elements are the coefficients of the basis vector expansion of the search direction.

The dimensionality of the extended subspace of the present invention, i.e., the number of basis vectors M, can in principle be any number greater than N, the number of unknown parameters that are being inverted for. Selecting M=N² allows for leakage between each parameter and all of the others during the inversion process. However, it may be that not all parameters leak into all other parameters. It may be possible to decide based on empirical or theoretical evidence which parameters may potentially have cross-talk among them, and then choose M accordingly. For example, if one is inverting for compressional velocity Vp, shear wave velocity $V_s$, and anisotropy parameter ε, one might reasonably expect leakage/cross-talk between $V_p$ and $V_s$, $V_p$ and ε, but not between $V_s$ and ε. So one could have 3 basis vectors for the Vp search direction (gradients w.r.t. $V_p$, $V_s$, ε), but only two basis vectors for the $V_s$ and ε search directions, for a total of 7 basis vectors (instead of 9). As an alternative example, one might follow Kennett's approach described above, in which case there would be N(N+1) basis vectors, i.e. 12 for the case of N=3.

In another embodiment of the invention, referring to the flow chart of FIG. 12, the invention is a computer-implemented method for iteratively inverting measured geophysical data to infer 3D subsurface models of N≥2 physical properties, comprising: (a) providing an initial model (121) for each physical property, wherein a subsurface region is subdivided into discrete cells, each cell having a value of the physical property; (b) for each physical property and for each of a plurality of the cells, representing a search direction (122), indicating whether the initial model needs to be updated positively or negatively, as a linear combination of a plurality of basis vectors; (c) determining coefficients (123) of each linear combination by minimizing, using a computer, a difference between one or more true parameters computed from well data or other known subsurface information and corresponding parameters predicted by the updated search direction; and (d) using the determined coefficients to generate search directions (124), and using the search directions to generate an updated model (125) for each physical property.

BRIEF DESCRIPTION OF THE DRAWINGS

The advantages of the present invention are better understood by referring to the following detailed description and the attached drawings, in which:

FIG. 3 simulates a search direction as it might be in actual practice, contaminated with cross-talk between the two parameters;

FIG. 4 shows the same gradient calculations, i.e. search directions, as in FIG. 3, but improved to reduce cross-talk by application of the method of FIG. 10;

Figure 1:
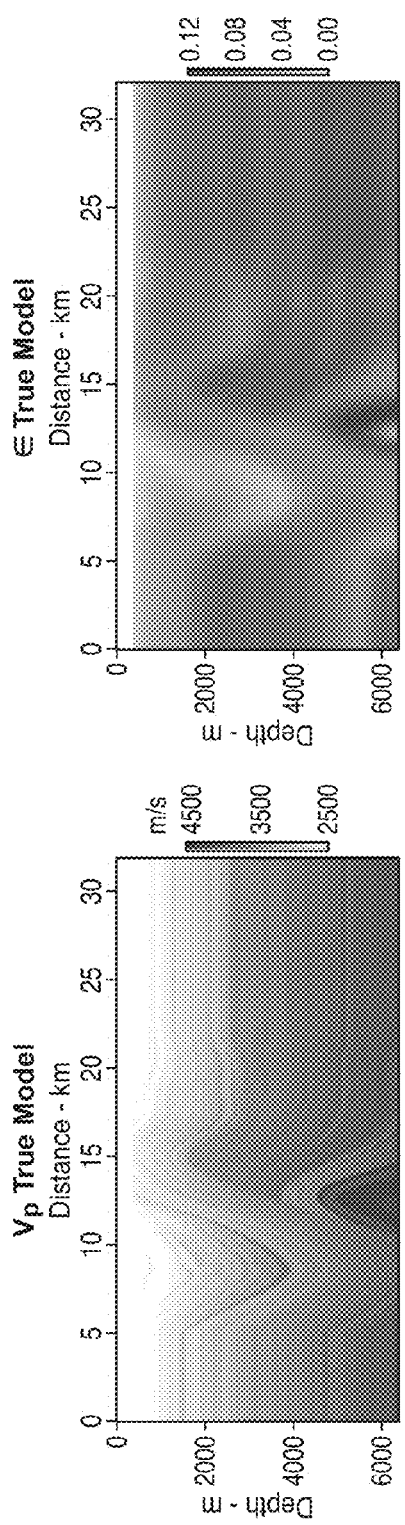
FIG. 1 shows the true model for the two parameters, $V_p$ (left) and ε (right), used for the test example.

The invention will be described in connection with example embodiments.

However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Extended Subspace Method

The present invention extends the traditional subspace method in a way that explicitly accounts for possible leakage between gradient components. This can be achieved by picking additional basis vectors. Once again, the concept may be illustrated for the case of two different parameters:

$$\Delta \tilde{m} = \alpha_1 \begin{bmatrix} \Delta m_1 \\ 0 \end{bmatrix} + \alpha_2 \begin{bmatrix} \Delta m_2 \\ 0 \end{bmatrix} + \beta_1 \begin{bmatrix} 0 \\ \Delta m_1 \end{bmatrix} + \beta_2 \begin{bmatrix} 0 \\ \Delta m_2 \end{bmatrix}$$

$$E(m + \Delta \tilde{m}) =$$
$$E(m) + (\nabla_{m_1} E)(\alpha_1 \Delta m_1 + \alpha_2 \Delta m_2) + (\nabla_{m_2} E)(\beta_1 \Delta m_1 + \beta_2 \Delta m_2) +$$
$$\frac{1}{2} [\alpha_1 \Delta m_1 + \alpha_2 \Delta m_2 \quad \beta_1 \Delta m_1 + \beta_2 \Delta m_2] \begin{bmatrix} \nabla_{m_1 m_1} E & \nabla_{m_1 m_2} E \\ \nabla_{m_2 m_1} E & \nabla_{m_2 m_2} E \end{bmatrix}$$
$$\begin{bmatrix} \alpha_1 \Delta m_1 + \alpha_2 \Delta m_2 \\ \beta_1 \Delta m_1 + \beta_2 \Delta m_2 \end{bmatrix}$$

Similarly to the original subspace method, one can get optimal scaling coefficients from:

$$\begin{bmatrix} \alpha_1 \\ \alpha_2 \\ \beta_1 \\ \beta_2 \end{bmatrix} = - \begin{bmatrix} \Delta m_1^T(\nabla_{m_1 m_1} E)\Delta m_1 & \Delta m_1^T(\nabla_{m_1 m_1} E)\Delta m_2 & \Delta m_1^T(\nabla_{m_1 m_2} E)\Delta m_1 & \Delta m_1^T(\nabla_{m_1 m_2} E)\Delta m_2 \\ \Delta m_2^T(\nabla_{m_1 m_1} E)\Delta m_1 & \Delta m_2^T(\nabla_{m_1 m_1} E)\Delta m_2 & \Delta m_2^T(\nabla_{m_1 m_2} E)\Delta m_1 & \Delta m_2^T(\nabla_{m_1 m_2} E)\Delta m_2 \\ \Delta m_1^T(\nabla_{m_1 m_2} E)\Delta m_1 & \Delta m_1^T(\nabla_{m_1 m_2} E)\Delta m_2 & \Delta m_1^T(\nabla_{m_2 m_2} E)\Delta m_1 & \Delta m_1^T(\nabla_{m_2 m_2} E)\Delta m_2 \\ \Delta m_2^T(\nabla_{m_2 m_2} E)\Delta m_1 & \Delta m_2^T(\nabla_{m_1 m_2} E)\Delta m_2 & \Delta m_2^T(\nabla_{m_2 m_2} E)\Delta m_1 & \Delta m_2^T(\nabla_{m_2 m_2} E)\Delta m_2 \end{bmatrix}^{-1} \quad (1)$$

$$\begin{bmatrix} \nabla_{m_1} E \Delta m_1 \\ \nabla_{m_1} E \Delta m_2 \\ \nabla_{m_2} E \Delta m_1 \\ \nabla_{m_2} E \Delta m_2 \end{bmatrix}$$

where the superscript T denotes matrix transpose.

The key novelty is that explicit mixing is performed between gradient components corresponding to different medium parameters, e.g., $V_p$ and $\epsilon$ or $V_p$ and $\rho$. The scaling/mixing coefficients $\alpha_i$ and $\beta_i$ are determined automatically from Equation 1 at the cost (measured in the number of Hessian applications to a vector) that is equal to the square of the cost of the traditional subspace method. The coefficients $\alpha_1$ and $\beta_2$ are the ones that would have been computed in the traditional subspace method, while $\alpha_2$ and $\beta_1$ correspond to the extended set of basis vectors being introduced in this invention. An important limitation of the method is that curvature information obtained from the Hessian may not be accurate far away from the global minimum, yielding scaling coefficients that would not lead to an improved search direction $\Delta m$. Thus, the method as presented so far would be unlikely to work consistently in practice.

Kennett et al. (1988) proposed an alternative approach to selecting an extended set of basis vectors in the subspace method:

$$\Delta \tilde{m} = \alpha_1 \begin{bmatrix} \Delta m_1 \\ 0 \end{bmatrix} + \alpha_2 \begin{bmatrix} (\nabla_{m_1 m_1} E)\Delta m_1 \\ 0 \end{bmatrix} + \alpha_3 \begin{bmatrix} (\nabla_{m_1 m_2} E)\Delta m_2 \\ 0 \end{bmatrix} + \quad (2)$$
$$\beta_1 \begin{bmatrix} 0 \\ \Delta m_2 \end{bmatrix} + \beta_2 \begin{bmatrix} 0 \\ (\nabla_{m_2 m_1} E)\Delta m_1 \end{bmatrix} + \beta_3 \begin{bmatrix} 0 \\ (\nabla_{m_2 m_2} E)\Delta m_2 \end{bmatrix}$$

However, the cost of this method is much higher (grows as the third power of the cost of the conventional subspace method) due to the need to compute four additional Hessian-vector products. In this case, the matrix in Eqn. (1) would look different, because of the choice of the extended subspace basis vectors. Instead of elements that look like $\Delta m_i^T(\nabla_{m_i m_j} E)\Delta m_j$, Eqn. (1) would have $\Delta m_i^T(\nabla_{m_i m_k} E)(\nabla_{m_k m_j} E)\Delta m_j$. Therefore not only additional Hessian-vector products would need to be computed, but the matrix of Eqn. (1) would become bigger because there will more basis vectors. In contrast, the present invention's extension of the subspace method utilizes gradients (or vectors obtained from gradients through application of simple processing steps, such as muting, scaling, etc.) with respect to inversion parameters as basis vectors, thus avoiding the need to perform additional Hessian-vector products.

Practical Issues and Further Extensions

The theory underlying the subspace method assumes that the Hessian correctly captures the behavior of the objective function. As mentioned above, when we are dealing with models that are far from the "true" ones, the objective function may not be locally quadratic. In this case Equation (1) may produce inaccurate estimates of $\alpha_i$ and $\beta_i$. Moreover, it is customary to replace the Hessian with its "reduced"

version—so-called Gauss-Newton Hessian—which itself becomes inaccurate away from the global minimum. Thus, to make the method work in practice, several modifications are helpful.

The first modification is an application of the well-known "trust region" concept. If the values of $\alpha_i$ and $\beta_i$ turn out to be too large (e.g., requiring a more than 10% update of medium parameters at any given iteration), they need to be scaled down (clipped.) Rewriting the vector of $\alpha_i$ and $\beta_i$ as a mixing matrix, $$\begin{bmatrix} \alpha_1 & \alpha_2 \\ \beta_1 & \beta_2 \end{bmatrix},$$

we can conveniently scale down either row of the matrix, depending on which parameter update exceeds a predefined threshold.

The second modification represents a second key novel step and has to do with adjusting the degree of mixing between gradient (search direction) components. The mixing can be adjusted by scaling the off-diagonal components of the mixing matrix by $(\gamma_\alpha, \gamma_\beta)$:

$$\begin{bmatrix} \alpha_1 & \gamma_\alpha \alpha_2 \\ \gamma_\beta \beta_1 & \beta_2 \end{bmatrix}.$$

Then a line search is performed, i.e., evaluate a series of objective functions $$E(m + \Delta \tilde{m}) = E\left(m + \begin{bmatrix} \alpha_1 & \gamma_\alpha \alpha_2 \\ \gamma_\beta \beta_1 & \beta_2 \end{bmatrix} \begin{bmatrix} \Delta m_1 \\ \Delta m_2 \end{bmatrix}\right)$$

and select the values of $(\gamma_\alpha, \gamma_\beta)$ corresponding to the best (i.e. minimum or maximum, depending upon how the objective function is formulated) objective function. (Note that the $\gamma_i$ are introduced for convenience; we could just as well have found optimal values of the off-diagonal elements of the mixing matrix). There are many known ways to perform the line search, but for purposes of the present invention, in order to minimize the computation cost, it is preferable to fit a quadratic form in $(\gamma_\alpha, \gamma_\beta)$ to the objective function above and then find optimal values of $(\gamma_\alpha, \gamma_\beta)$:

$$E(m+\Delta\tilde{m};\gamma_\alpha,\gamma_\beta)=\alpha_0+\alpha_1\gamma_\alpha+\alpha_2\gamma_\beta+\alpha_3\gamma_\alpha^2+\alpha_4\gamma_\beta^2+\alpha_5\gamma_\alpha\gamma_\beta.$$

The objective function is evaluated at six different points $(\gamma_\alpha, \gamma_\beta)$, e.g., (1,1), (0.75,1), (1,0.75), (0.5,1), (1,0.5), (0.5, 0.5) and the resulting system of linear equations solved for $\alpha_i$. When the quadratic form is not positive definite, and end point (either 0 or 1) can be chosen for each $\gamma$. Note that this line search is different from the traditional one and serves a different purpose. Conventionally, the line search is performed to determine the best possible step size (scaling of the model update), while it is used here to determine the best possible set of mixing coefficients that minimize leakage/cross-talk between different inversion parameters. Once the mixing coefficients are determined and updated search directions are obtained, a conventional line search can be applied to further scale the updated search directions.

Figure 10:
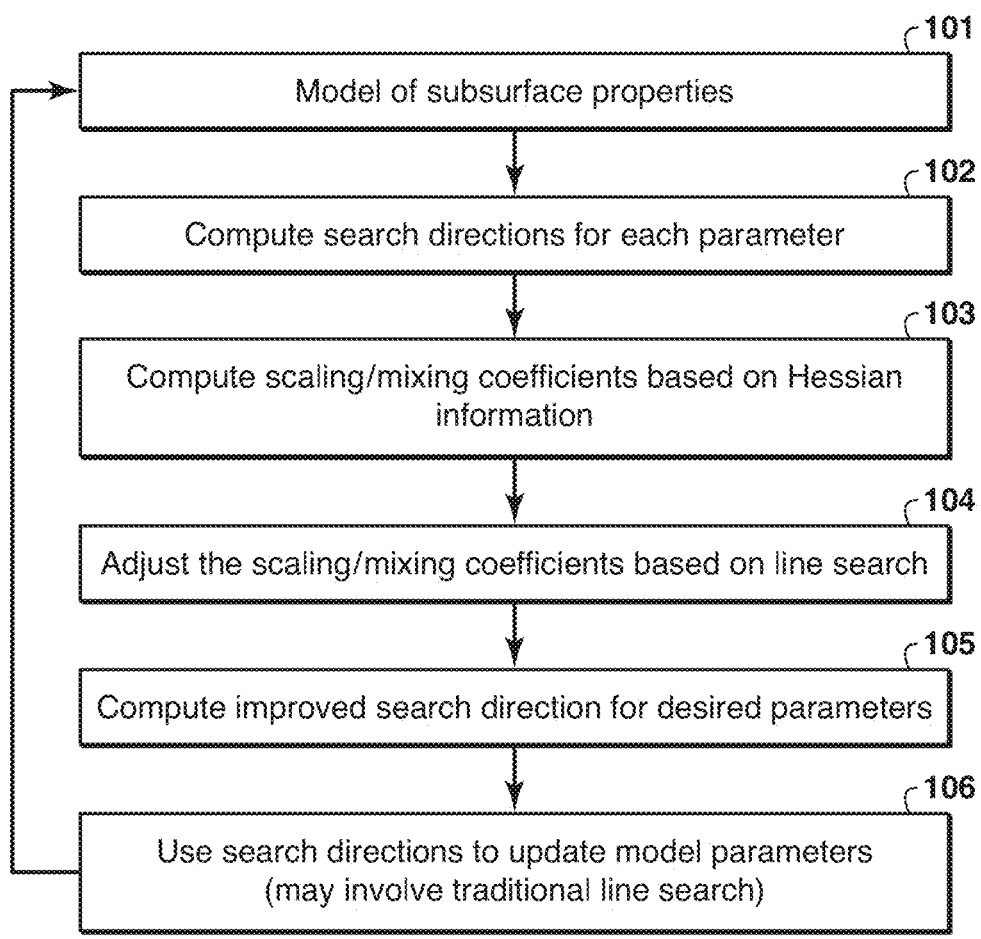
FIG. 10 is a flow chart showing basic steps in the present inventive method for using an extended set of basis vectors, with explicit mixing of coefficients, to compute gradient updates to physical property models during iterative inversion of geophysical data.

The third key novel step addresses the situation in which the level of cross-talk is spatially varying, so that scaling factors $(\gamma_\alpha, \gamma_\beta)$ need to be spatially varying as well. The line search can be performed separately for each shot, producing a spatially varying set of scaling factors. Note that the cost of performing the line search for each shot individually is the same as the cost of traditional spatially invariant line search. The only difference is that instead of summing all individual objective functions computed for each shot record and then selecting the values of $(\gamma_\alpha, \gamma_\beta)$ that correspond to the best cumulative objective function, the selection is performed shot-by-shot, skipping the summation. Each shot is assigned a spatial location and the selected optimal value of $(\gamma_\alpha, \gamma_\beta)$ is also assumed to occur at that location. Finally, interpolation may be performed to obtain a spatially varying distribution of optimal scaling factors $(\gamma_\alpha, \gamma_\beta)$, followed by optional smoothing to avoid introducing artifacts into the inversion. FIG. 10 is a self-explanatory flowchart showing basic steps in this embodiment of the present inventive method.

Incorporating Well Constraints

The idea of using gradients as basis vectors for forming an improved update (search direction) in inversion can be extended to the case in which well logs or other reliable information regarding the subsurface is available, representing another key novel step. Similarly to the methodology described in the previous sections, an improved update (search direction) can be obtained by setting $$\Delta \tilde{m}_i = w_1^i \Delta m_1 + w_2^i \Delta m_2 + w_3^i e \qquad (3),$$

where i=1,2; e is a vector with all components set to "1". The unknown coefficients $w_1^i$, $w_2^i$, $w_3^i$ can be determined by requiring that the improved model update fit the "true" well-log-based update $$\Delta m_i^{true} = m_i^{well\ log} - m_i^{current}$$

in some norm:

$$\|\Delta m_i^{true} - \Delta m_i\|_{L_n} \to \min.$$

In general, optimal coefficients $w_1^i$, $w_2^i$, $w_3^i$ can be found numerically. If n=2, i.e., the $L_2$ norm is used, the solution to this minimization problem is given by $$\begin{bmatrix} w_1^i \\ w_2^i \\ w_3^i \end{bmatrix} = \begin{bmatrix} \Delta m_1^T \Delta m_1 & \Delta m_1^T \Delta m_2 & \Delta m_1^T e \\ \Delta m_2^T \Delta m_1 & \Delta m_2^T \Delta m_2 & \Delta m_2^T e \\ e^T \Delta m_1 & e^T \Delta m_2 & e^T e \end{bmatrix}^{-1} \begin{bmatrix} \Delta m_1^T \Delta m_i^{true} \\ \Delta m_2^T \Delta m_i^{true} \\ e^T \Delta m_i^{true} \end{bmatrix} \qquad (4)$$

The $\Delta m_i$ can be set proportional (or equal) to the gradients of E, their preconditioned/modified versions, or the improved search directions coming from the extended subspace method described in the previous sections.

There are two key differences with the extended subspace method described previously. First, there is effectively no additional computational cost to be incurred in computing an improved search direction based on the well log information because Hessian-vector products need not be computed and just a small 3×3 matrix has to be inverted. Secondly, the set of basis vectors was extended even further by including vector e. This vector allows us to determine the background ("DC") component of the update. It is well known that FWI cannot correctly compute the background update when seismic data are missing low frequencies, as is the case for most datasets acquired to date. For some parameters, such as Thompsen's anisotropy parameter δ, this is impossible under any circumstances based on surface seismic data alone. Thus, the vector e was not included previously because it would have been difficult to obtain it reliably. (The availability of a direct measurement of subsurface medium parameters at well locations changes the situation.)

Of course, e can be more general than a vector consisting of "1". For example, it could be a depth-varying function.

If more than one well is available, optimal coefficients $w_1^i, w_2^i, w_3^i$ should preferably be found at each well location and spatially interpolated between wells and extrapolated away from the wells.

Figure 11:
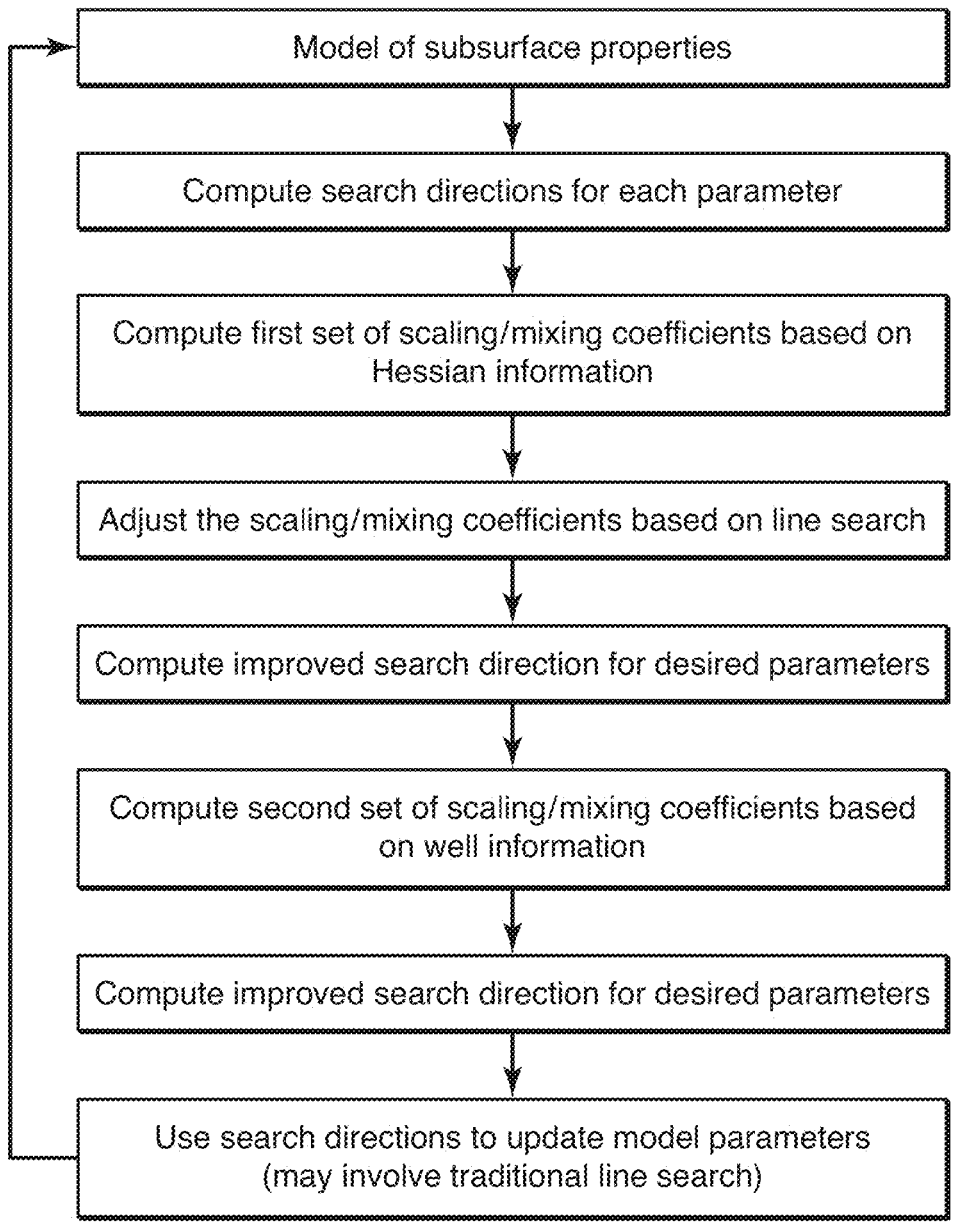
FIG. 11 is a flow chart showing basic steps for combining the method of FIG. 10 with well (or other known) constraints.

In a typical application the extended subspace method based on the surface seismic data might be used first to produce an improved model update, i.e. search direction, followed by a further modification based on the well log information. Basic steps in this embodiment of the invention are shown in the self-explanatory FIG. 11. Note that not all parameters may be constrained by either well logs or surface seismic data, so the two steps (extended subspace and well constraints) need not apply to the same set of parameters. For example, one could compute improved search directions for $V_p$ and $\epsilon$ based on the Hessian of the objective functions and then compute improved search directions for $V_p$ (again) and $\delta$ based on the well log information.

Figure 12:
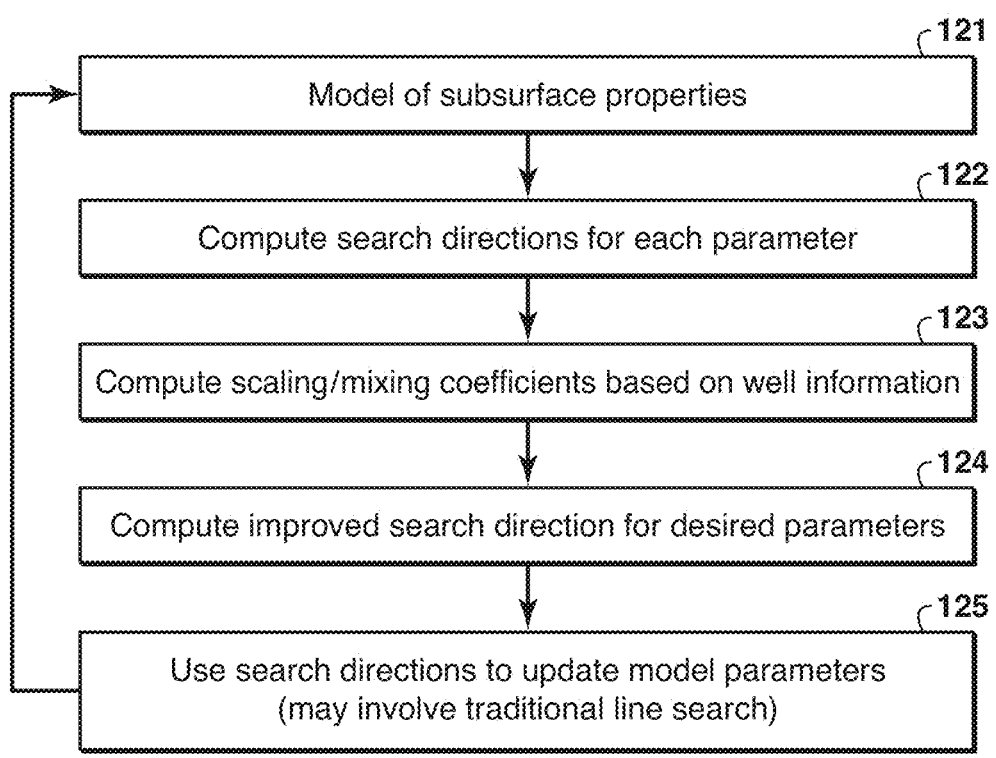
FIG. 12 is a flow chart showing basic steps for the inversion method of FIG. 11, using well constraints alone, without also using the extended subspace technique of FIG. 10.

Additionally, application of the extended subspace method could be skipped and well log information used directly to obtain an improved search direction. Basic steps in this embodiment of the invention are shown in the self-explanatory FIG. 12. The advantage of this approach is that the significant computation cost associated with the evaluation of the Hessian-vector products required by Equation 1 is avoided. Furthermore, since well information represents a measurement of the actual subsurface properties, the updated search directions can be considered to be optimal and the traditional line search performed to determine optimal scaling of model updates can be skipped as well. The implication of this choice is that the model update no longer relies directly on the assumption that the objective (cost) function value should improve at each iteration. It is entirely possible that the fit between simulated and field data may temporarily become worse, although model fit (i.e., how closely the model approximates subsurface properties) gets better. This situation is known as "local minimum", reflecting the fact that the objective function may go through peaks and troughs as we progress from the initial model to the true one, and reaches its overall optimal value ("global minimum") only at the end of the process. Conventional derivative-based methods are not able to overcome the "local minimum" problem, so incorporating well log information and skipping traditional line search may allow the inversion to converge to a significantly better model.

EXAMPLES

Figure 2:
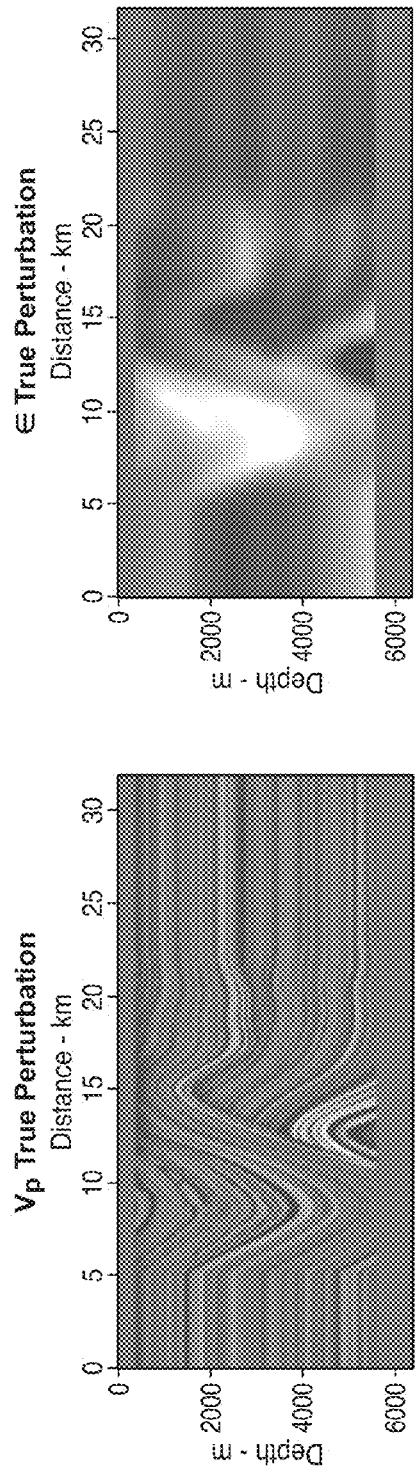
FIG. 2 shows a perfect update Δm (also the "true" search direction) for a given, slightly perturbed (from the true FIG. 1) model.

The present inventive method was tested using synthetic data generated by assuming the "true" models for the parameters $V_p$ and $\epsilon$ shown in FIG. 1, based on the SEAM model. (See "SEAM update: Completion of Phase I Acoustic Simulations," *The Leading Edge*, June, 2010.) First, a model was chosen (not shown) with a very small perturbation in both for $V_p$ and $\epsilon$ to ensure that the Gauss-Newton Hessian is a good measure of the curvature of the objective function. The slightly perturbed model represents a typical current model in the course of iterative inversion. The "true" search directions were then constructed, which were the difference between the true and the perturbed models (FIG. 2). As an illustration of the cross-talk that could be contaminating search directions in a realistic inversion, a linear combination of the "true" search directions was computed, thereby introducing low-frequency overprint into the search direction for $V_p$ and high-frequency reflectivity overprint into the search direction for $\epsilon$ (FIG. 3). "De-mixing" (solving for the coefficients $\alpha_1$, $\alpha_2$, $\beta_1$, and $\beta_2$) was then performed using the extended subspace method of the present invention (Equation 1), which was able to remove the low-frequency overprint from the $V_p$ search direction and almost remove the high-frequency overprint from the $\epsilon$ search direction (FIG. 4).

Figure 5:
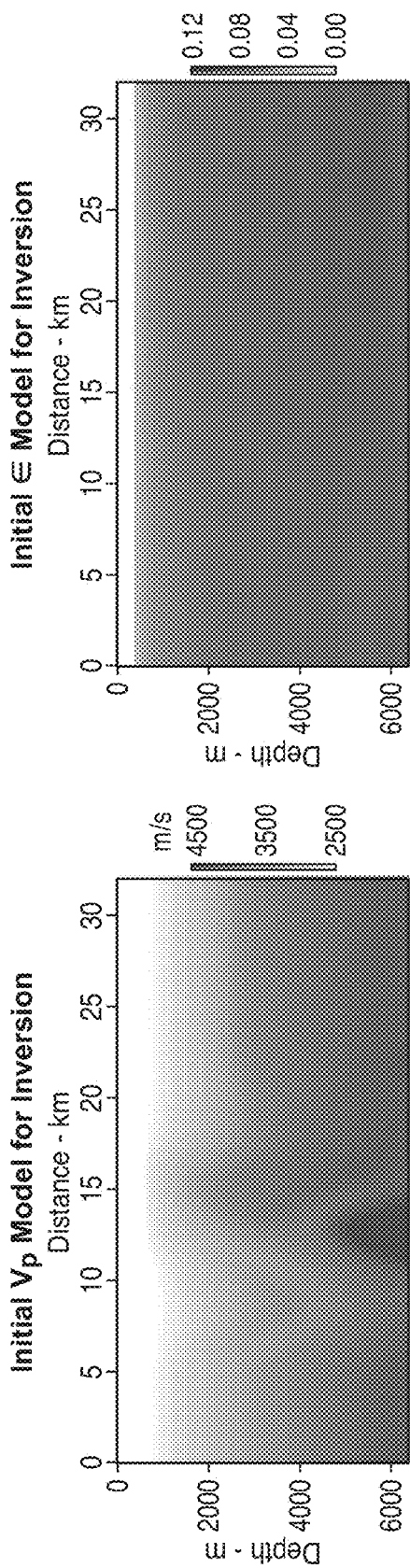
FIG. 5 shows initial models to be used in a 2-parameter inversion of synthetic data generated using the true model of FIG. 1.
Figure 6:
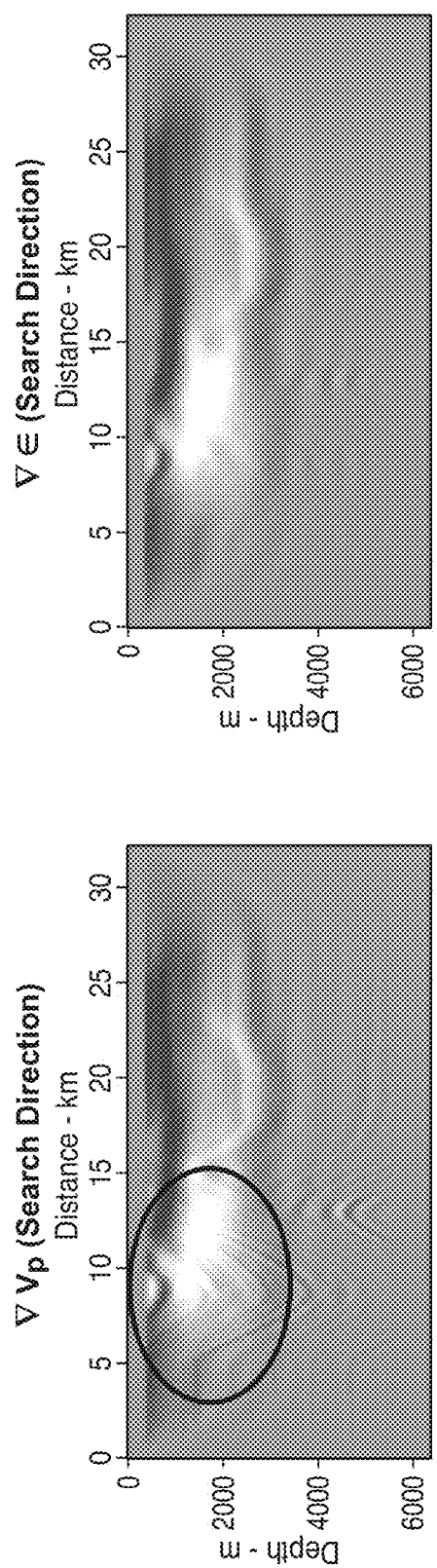
FIG. 6 shows preconditioned gradients (search directions) of an objective function computing the misfit between the true modeled synthetic data and data simulated using the initial model of FIG. 5.
Figure 7:
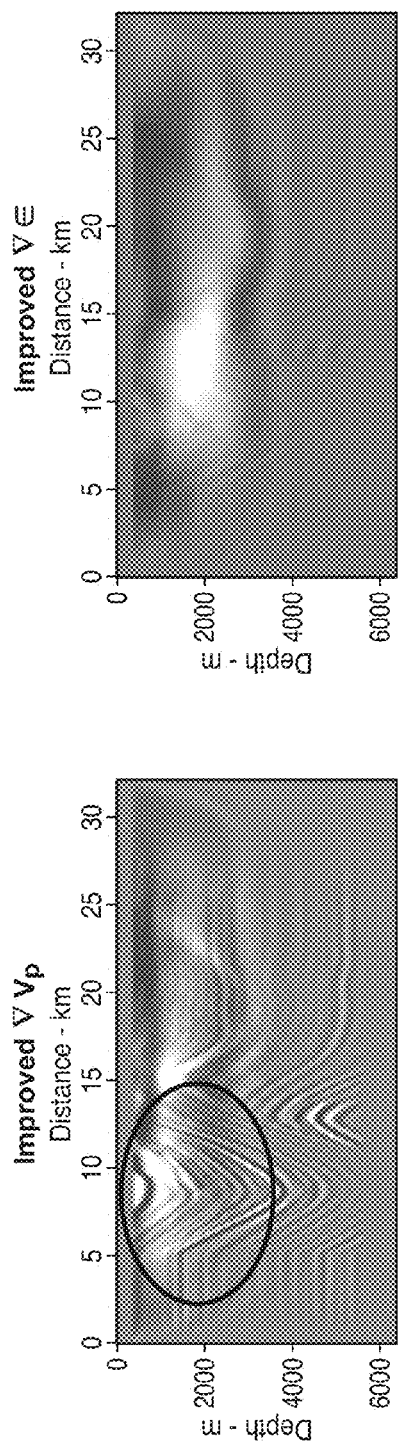
FIG. 7 shows search directions comparable to those of FIG. 6, but with the gradient computed using the extended subspace method of FIG. 10.
Figure 8:
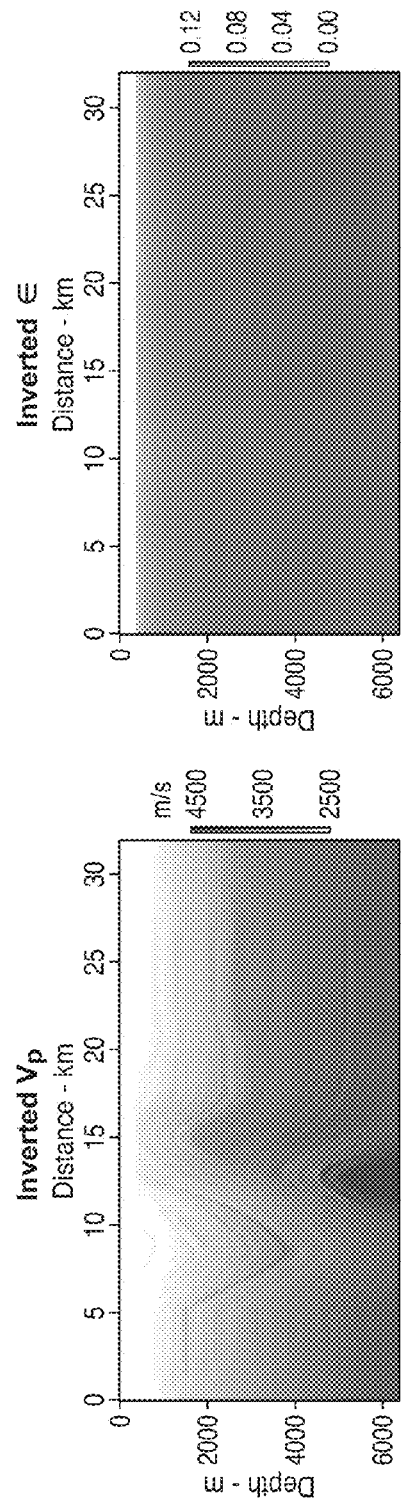
FIG. 8 shows the inverted property models corresponding to FIG. 6.
Figure 9:
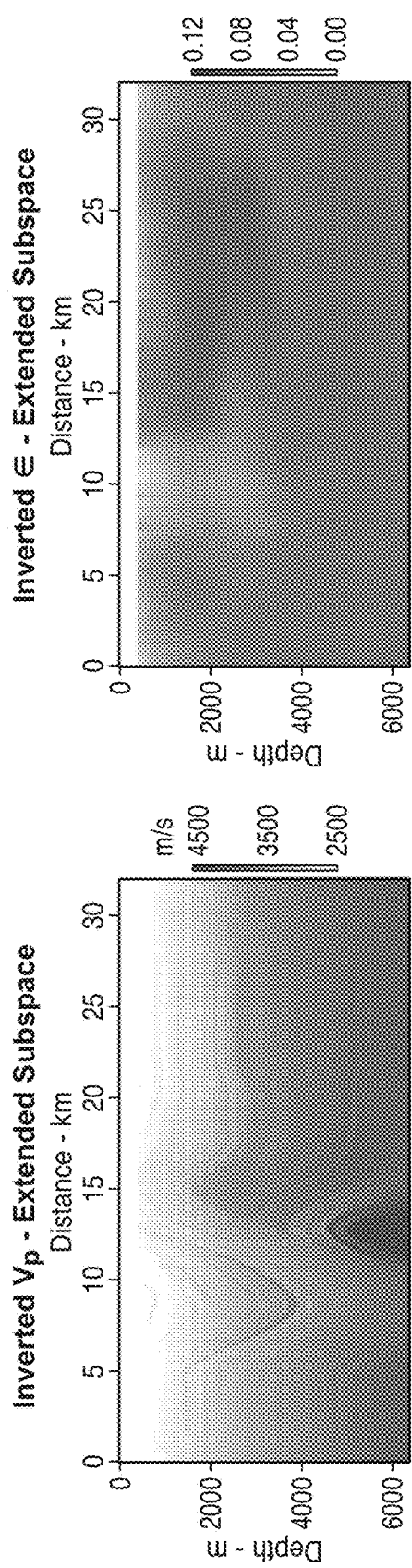
FIG. 9 shows the inverted property models corresponding to FIG. 7.

Next, a two-parameter inversion was performed for $V_p$ and $\epsilon$ using the initial model shown in FIG. 5. Comparing the true and initial models (FIGS. 1 and 5), it can be seen that the update for $V_p$ should be dominated by reflectivity, while the update for $\epsilon$ should be smooth. Due to the cross-talk between $V_p$ and $\epsilon$, the gradient for $V_p$ contains an undesirable low-frequency component (FIG. 6, oval at left), which may prevent inversion from converging to the correct solution. Computing the de-mixing coefficients using Eqn. 1 and using them to compute new search directions for $V_p$ and $\epsilon$, shown in FIG. 7, we are able to reduce the undesirable low frequency content in the $V_p$ search direction, while enhancing the corresponding component of the $\epsilon$ search direction (see ovals). As mentioned above, this transformation is performed at each iteration of the inversion. (The gradient shown in FIGS. 6 and 7 were preconditioned, which means that the raw gradients were gained in depth to compensate for the decay of wavefields as they propagate down.) Finally, FIGS. 8 and 9 illustrate that the application of the extended subspace method leads to a better inversion result. The oval in the FIG. 8 $\epsilon$ model indicates regions, where $\epsilon$ has not been recovered correctly, leading to mispositioning of the reflectors (indicated by the arrow) in the $V_p$ model. The oval in the FIG. 9 $\epsilon$ model indicates regions, where E has been recovered better than before, leading to correct positioning of the reflectors (indicated by the arrow) in the $V_p$ model. FIG. 8 was generated using the Kennett subspace method. The inversion results of both figures are after several iteration cycles.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

REFERENCES

1. Heinkenschloss, M., "Numerical Solution of Implicitly Constrained Optimization Problems," CAAM Technical Report TR08-05 (2008). http://www.caam.rice.edu/~heinken/papers/MHeinkenschloss_2008a.pdf
2. Kennett, B. L. N., Sambridge, M. S., Williamson, P. R., "Subspace methods for large scale inverse problems involving multiple parameter classes," *Geophysical Journal International* 94, 237-247 (1988).
3. Sambridge, M. S., Tarantola, A., Kennett, B. L. N., "An alternative strategy for non-linear inversion of seismic waveforms," *Geophysical Prospecting* 39, 723-736 (1991).
4. Tsvankin, I., *Seismic Signatures and Analysis of Reflection Data in Anisotropic Media*, Pergamon Press, page 18 (2001).

The invention claimed is:

1. A computer-implemented method for iteratively inverting measured geophysical data to infer 3D subsurface models of N physical properties with N≥2 and prospecting for hydrocarbons, comprising:

providing an initial model for each physical property, wherein a subsurface region is subdivided into discrete cells, each cell having a value of the physical property;

for each physical property and for each of a plurality of the cells, representing a search direction, indicating whether the initial model needs to be updated positively or negatively, as a linear combination of M basis vectors with M>N, wherein:

each basis vector has its own coefficient in the linear combination, said coefficient to be determined;

the basis vectors are chosen such that their coefficients account for cross-talk between the N physical properties during inversion, wherein a mixing matrix is formed from the coefficients of the basis vectors, and degree of mixing between the model updates for the N physical properties is adjusted by scaling off-diagonal elements of the mixing matrix with scaling factors that are optimized in the inversion; and optimal values of the coefficients are simultaneously solved for, using a computer, to minimize or maximize an objective function measuring misfit between model-simulated geophysical data and the measured geophysical data, wherein solving for the coefficients is performed at least by numerical computation constrained by the geophysical data;

generating search directions with the optimal values of the coefficients, and generating an updated model for each physical property by making changes, respectively, to the initial model for each physical property in the search directions; and producing an image of the subsurface from the updated model, which includes subsurface reflectors, positioned with the optimal coefficients, that returned seismic energy to receivers that recorded the measured geophysical data, and prospecting for hydrocarbons according to structural features of the subsurface region.

2. The method of claim 1, wherein each basis vector has a component that is, or is proportional to, a gradient, with respect to model parameters of one of the N physical properties, of the objective function.

3. The method of claim 1, wherein the optimizing of the scaling factors is based on a line search.

4. The method of claim 3, wherein the line search is performed by steps comprising fitting a polynomial function of the scaling factors to the objective function and then finding values of the scaling factors that optimize the objective function.

5. The method of claim 3, further comprising performing a conventional line search to determine an optimal step size for the model update.

6. The method of claim 1, wherein the scaling factors are spatially dependent.

7. The method of claim 6, wherein the optimization comprises performing line searches, and a separate line search is performed for each source shot in a geophysical survey that generated the measured geophysical data, thereby providing the spatial dependence.

8. The method of claim 1, wherein the optimization of the coefficients and the scaling factors is based on one or more Hessians of the objective function.

9. The method of claim 1, wherein optimal values of the scaling factors are determined by a line search comprising evaluating the objective function E for an updated model $m+\Delta m$ for a plurality of different values of the scaling factors, and selecting a combination of scaling factors giving a least value of E.

10. The method of claim 1, further comprising adjusting the search directions before the generating an updated model for each physical property, wherein each adjusted search direction is represented by a linear combination of a plurality of basis vectors, and coefficients of the linear combination are determined by minimizing a difference between one or more true parameters computed from well data or other known subsurface information and corresponding parameters predicted by the updated search direction.

11. The method of claim 10, wherein the plurality of basis vectors is N+1 in number, comprising a gradient of the objective function with respect to model parameters of each of the N physical properties, plus an additional basis vector whose coefficient allows matching to the well data or other known subsurface information.

12. The method of claim 11, wherein every component of the additional basis vector is unity.

13. The method of claim 1, wherein the geophysical data are seismic data, and the N physical properties are selected from the group consisting of compressional and shear-wave velocities, $V_p$ and $V_s$, density $\rho$, and Thompsen anisotropy parameters $\epsilon$ and $\delta$.

14. The method of claim 1, wherein the optimization is based on one or more Hessians of the objective function.

15. The method of claim 1, wherein rock-physics-based or empirical relationships between physical property parameters, or well data constraints, or both, are used to reduce number of search direction coefficients to be solved for by the iterative numerical computation constrained by the geophysical data.

16. A computer-implemented method for iteratively inverting measured geophysical data to infer 3D subsurface models of N physical properties with N>2 and prospecting for hydrocarbons, comprising:

providing an initial model for each physical property, wherein a subsurface region is subdivided into discrete cells, each cell having a value of the physical property;

for each physical property and for each of a plurality of the cells, representing a search direction, indicating whether the initial model needs to be updated positively or negatively, as a linear combination of a plurality of basis vectors;

each basis vector has its own coefficient in the linear combination, wherein: the basis vectors are chosen such that their coefficients account for cross-talk between the N physical properties during inversion, wherein a mixing matrix is formed from the coefficients of the basis vectors, and degree of mixing between the model updates for the N physical properties is adjusted by scaling off-diagonal elements of the mixing matrix with scaling factors that are optimized in the inversion;

determining coefficients of each linear combination by minimizing or maximizing, using a computer, a difference between one or more true parameters computed from well data or other known subsurface information and corresponding parameters predicted by the updated search direction;

generating search directions with the determined coefficients, and generating an updated model for each physical property by making changes, respectively, to the initial model for each physical property in the search directions; and producing an image of the subsurface from the updated model, which includes subsurface reflectors, positioned with the optimal coefficients, that returned seismic energy to receivers that recorded the measured geophysical data, and prospecting for hydrocarbons according to structural features of the subsurface region.

17. The method of claim 16, wherein the plurality of basis vectors is N+1 in number, comprising a gradient of the objective function with respect to model parameters of each of the N physical properties, plus an additional basis vector whose coefficient allows matching to the well data or other known subsurface information.

18. The method of claim 17, wherein every component of the additional basis vector is unity.

* * * * *